United States Patent [19]

Wilk

[11] Patent Number: 5,353,786
[45] Date of Patent: Oct. 11, 1994

[54] SURGICAL LIGHTING METHOD

[76] Inventor: Peter J. Wilk, 185 West End Ave., New York, N.Y. 10023

[21] Appl. No.: 84,753

[22] Filed: Jun. 30, 1993

Related U.S. Application Data

[62] Division of Ser. No. 825,551, Jan. 24, 1992, abandoned.

[51] Int. Cl.$^5$ ............................ A61B 1/06; F21V 8/00
[52] U.S. Cl. ...................................... 128/23; 362/32; 362/219; 362/804
[58] Field of Search ................... 128/20, 23, 395–398, 128/5; 362/32, 105, 219, 234, 240, 804; 604/80; 607/88, 90, 91, 93

[56] References Cited

U.S. PATENT DOCUMENTS

| | | | |
|---|---|---|---|
| 3,807,393 | 4/1974 | McDonald | 128/20 |
| 3,809,072 | 5/1974 | Ersek et al. | 128/23 |
| 4,078,555 | 3/1978 | Takahashi | 128/4 |
| 4,434,791 | 3/1984 | Darnell | 128/20 |
| 4,471,412 | 9/1984 | Mori | 362/32 |
| 4,562,832 | 1/1986 | Wilder et al. | 362/32 X |
| 4,597,030 | 6/1986 | Brody et al. | 362/32 |
| 4,605,990 | 8/1986 | Wilder et al. | 362/32 |
| 4,627,421 | 12/1986 | Symbas et al. | 128/20 |
| 5,000,535 | 3/1991 | Churchill | 362/32 X |
| 5,050,047 | 9/1991 | Viner et al. | 362/32 |
| 5,057,981 | 10/1991 | Bowen et al. | 362/219 |
| 5,109,461 | 4/1992 | Churchill | 362/32 X |
| 5,159,921 | 11/1992 | Hoover | 128/20 |

FOREIGN PATENT DOCUMENTS 0133102  6/1988  Japan ................................. 385/901

OTHER PUBLICATIONS

The Max Wocher & Son Co., 90th Edition Catalog Seward Medical brochure, p. 9.

Primary Examiner—Richard J. Apley
Assistant Examiner—John P. Leubecker
Attorney, Agent, or Firm—R. Neil Sudol; Henry D. Coleman

[57] ABSTRACT

A lighting device for a surgical operating room comprises a light source for generating visible electromagnetic radiation, at least one light output operatively connected to the light source for emitting and directing the electromagnetic radiation, and an attachment component connected to the light output for removably attaching the light output to a patient. The light output or outlets are mounted to a surgical retractor or, alternatively, to a flexible tube with an adhesive layer for temporarily binding the tube to a skin surface of the patient. The tube is also provided with a form retention element for enabling the tube to be bent to conform to a surgical site. A disposable transparent sheath surrounds the tube or the retractor. Other forms of the lighting device include goosenecks and a frame disposable on the operating table over the patient. In every case, the light source is a cold light source, i.e. spaced from the light output or outlets by an optical fiber.

12 Claims, 5 Drawing Sheets

SURGICAL LIGHTING METHOD

CROSS-REFERENCE TO RELATED APPLICATION

This application is a division of application Ser. No. 07/825,551 filed Jan. 24, 1992 and now abandoned.

BACKGROUND OF THE INVENTION

This invention relates to a lighting method with particular application in the operating room.

Generally, the lighting devices in operating rooms are overhead assemblies or devices with stands which place the lights at head level of the operating surgeons. To change the direction of the light beams so as to more effectively illuminate the surgical site, the surgeon or an assistant must reach up and manually adjust the lights. When the adjustment is effectuated by an assistant, there is some delay inherent in the assistant's understanding where the surgeon desires to have the illumination. When the adjustment is effectuated by the surgeon, the surgeon is distracted temporarily from surgery. Moreover, one of the surgeon's hands must be free to temporarily abandon the operating site.

In any event, the delay and inconvenience of readjusting operating room lighting accumulates and detracts from the efficiency and efficacy of the surgical procedure.

The sources of the electromagnetic radiation in the operating room lighting systems are usually at the locations of the light emission. Consequently, a lot of heat energy is transferred to the surgeons and assistants around the operating table. This heat is inconvenient and distracting and should be avoided, if possible.

OBJECTS OF THE INVENTION

An object of the present invention is to provide a surgical lighting method wherein the light output or outlet is closer than conventional lighting devices to the surgical site.

A more specific object of the present invention is to provide such a lighting method wherein the heat transferred to the surgeon and the operating site is diminished if not eliminated.

Another object of the present invention is to provide a surgical lighting method wherein adjustment of the direction of illumination is facilitated.

Another, more particular, object of the present invention is to provide a surgical lighting method wherein sterility maintenance is facilitated.

A further particular object of the present invention is to provide a surgical lighting method which may be adapted to fit the surgical site.

SUMMARY OF THE INVENTION

A method for use in surgery to illuminate a surgical site on a patient comprises, in accordance with the present invention, the steps of (a) providing a substantially flexible elongate carrier member with at least one linear end segment and a plurality of individual light outlets spaced from one another along the end segment, (b) disposing at least a portion of the carrier member on the patient so that the portion is at least partially juxtaposed to the surgical site and so that the light outlets can effectively illuminate the surgical site, (c) surgically operating on organic tissues at the surgical site, and (d) transmitting electromagnetic radiation from a light source through the carrier member and out through the light outlets to illuminate the surgical site during the operation.

According to another feature of the present invention, the carrier member is removably affixed to a skin surface of the patient at the surgical site. The fixation may be accomplished by applying an adhesive strip to the skin surface, the adhesive strip being attached to the carrier member. The adhesive attachment may serve in part to maintain the carrier member in an arcuate configuration conforming to the surgical site.

According to a further feature of the present invention, the method further comprises the steps of (e) forming at least the portion of the carrier member into an arcuate configuration conformed to the surgical site and (f) exerting a force on the portion of the carrier member to maintain the portion of the carrier member in the arcuate configuration during the steps of operating and transmitting. Where the carrier member is provided with a bendable element (such as a metallic strip) for maintaining the carrier member in the arcuate configuration, the method also comprises the step of manipulating the carrier member to deform the bendable element so that the carrier member assumes the arcuate configuration. Alternatively or additionally, the carrier member may be maintained in a loop-shaped arcuate configuration by fastening a free end of the carrier member to a middle portion of the carrier member, e.g., by a rubber band or clip or tie string.

According to an additional feature of the present invention, means are provided on the carrier member for independently varying the orientations of the light outlets. The surgical method then includes the step of manually adjusting the orientations of a plurality of the light outlets to differentially vary the direction of light emitted thereby.

According to yet another feature of the present invention, the carrier member is provided with a spacer element which is attached to the skin surface of the patient to control the distance of the carrier member from the surgical site.

According to yet another feature of the present invention, the carrier member is bifurcated along the end segment into two carrier member sections each provided with a plurality of spaced light outlets. The step of forming includes the step of bending at least a portion of one of the carrier member sections into an arcuate shape.

Where the carrier member is further provided with a disposable sheath surrounding the carrier and removably fastened at least indirectly thereto, the method further comprises the step, implemented after the steps of operating and transmitting, of removing the sheath from the carrier member.

In a surgical lighting method in accordance with the present invention, light output or outlets are closer than conventional lighting devices to the surgical site. In addition, in many retractors carrying light outputs or outlets in accordance with the present invention, the lights surround the surgical site, thereby eliminating shadows which may induce spurious or mistaken perception. Such surgical retractors may have a pair of arms which maintain external tissues in a displaced or withdrawn configuration about an internal surgical site.

In a surgical lighting device in accordance with the present invention, heat transferred to the surgeon and the operating site is diminished if not eliminated. The light source is spaced from the light output or outlets by an optical fiber.

In a surgical lighting device in accordance with the present invention, adjustment of the direction of illumination, i.e., modification of the illuminated area, is facilitated. The light output or outlets are juxtaposed to the surgical site and reduce the time that the surgeon needs to adjust the lighting. In addition, the surgeon can essentially keep his eyes on the surgical site. Inasmuch as assistants need not adjust the lights, they are freed for other duties. All in all, operating room efficiency is augmented.

In a surgical lighting device in accordance with the present invention, sterility maintenance is facilitated. At the termination of an operation, the disposable transparent sheath need only be removed, discarded, and replaced with another sheath. Complicated washing and sterilizing operations are obviated.

A surgical lighting device in the form of a light-outlet-carrying tube in accordance with the present invention may be adapted to fit the surgical site. The tube is easily bent to be reconfigured to conform to the surgical site.

DETAILED DESCRIPTION

Figure 1:
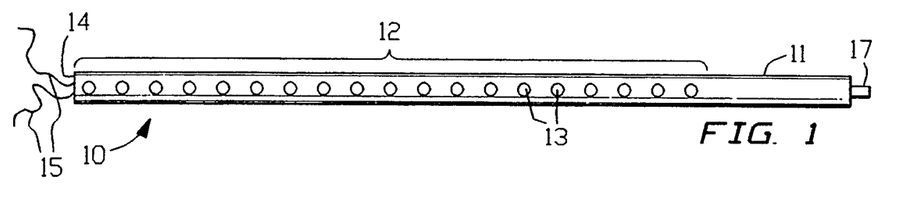
FIG. 1 is an elevational side view of a lighting device including a flexible hose in accordance with the present invention.

As illustrated in FIG. 1, a surgical lighting device 10 comprises a flexible hose 11 provided along an end segment 12 with a plurality of equispaced light output or outlets in the form of windows 13. At a free tip 14 of end segment 12, hose 11 is provided with a pair of tie strings 15 for detachably securing the hose tip to a middle portion of the hose to form a loop 16, illustrated in FIG. 4. At an end opposite tie strings 15 and end segment 12, hose 11 is provided with an optical fiber bundle 17 for connecting the hose to a light source 18 (FIG. 4).

Figure 2:
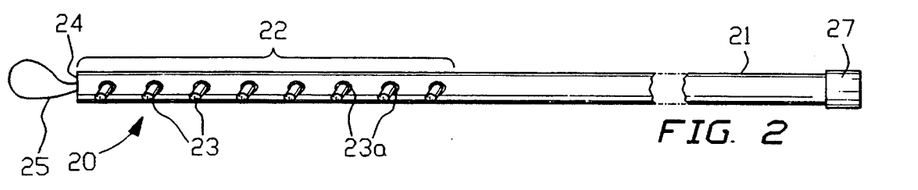
FIG. 2 is an elevational side view of another lighting device including a flexible hose in accordance with the present invention.

Another surgical lighting device 20 is illustrated in FIG. 2. Device 20 similarly takes the form of a flexible hose 21, preferably made of synthetic resin material such as polyethylene, polypropylene, nylon or polytetrafluoroethylene. Hose 21 is provided along an end segment 22 with a linear array of light output or outlet ports 23 which are swivelably mounted to hose 21 via respective pivoting couplings 23a. A proximal end of hose 21 is provided with a coupling member 27 for connecting that hose end to light source 18 (FIG. 4). At a free tip or end 24, hose 21 is provided with a small loop 25 preferably made of an elastic synthetic resin material for detachably securing the hose tip to a middle portion of the hose to form a loop, as illustrated in FIG. 4 with respect to hose 11 of FIG. 1.

Figure 3:
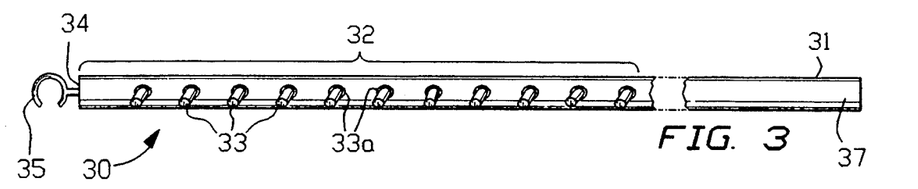
FIG. 3 is an elevational side view of yet another lighting device including a flexible hose in accordance with the present invention.

Yet another lighting device 30 is depicted in FIG. 3. Again, that lighting device comprises a flexible synthetic resin hose 31 provided along an end segment 32 with a linear array of light output or outlet ports 33 which are swivelably mounted to hose 31 via respective manually pivotable couplings 33a. A proximal end of hose 31 is provided with a coupling member 37 for connecting the hose to light source 18 (FIG. 4). Hose 31 carries a plurality of optical fibers (see, e.g., FIG. 5) for transmitting visible electromagnetic radiation from light source 18 to light output ports 33. Hose end 37 is sufficiently resilient, for example, to receive a male inlet member (not illustrated) of light source 18 in a fit sufficient to form an effective optical link between the light source and the optical fibers of hose 31. At free tip or end 34, hose 31 is provided with a resilient clip fastener or coupling element 35 for securing hose tip 34 to hose 31 along a middle portion thereof to form a loop, as shown in FIG. 4.

Figure 4:
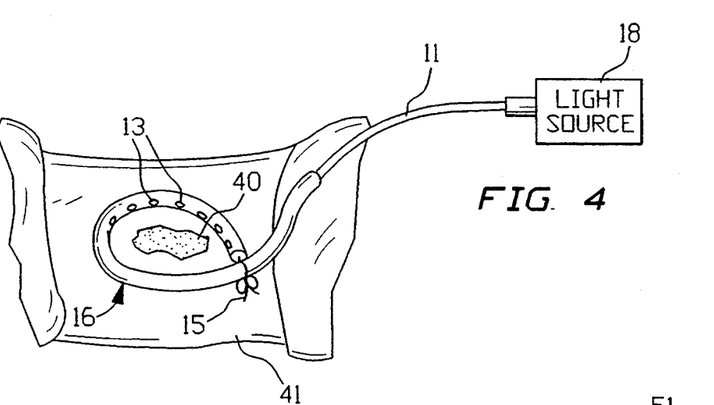
FIG. 4 is a diagrammatic perspective view of the lighting device of FIG. 1, showing the device connected to a light source and in use during a surgical operation.

In use of a surgical lighting device 10, 20, or 30, as depicted in FIG. 4 with reference particularly to device 10, the optical fiber bundle or coupling member 17, 27 or 37 is connected to light source 18. With respect to surgical lighting device 20, hose 21 is first brought through loop 25 and then end 37 is connected to the light source.

Upon the connection of hose 10 or 30 to light source 18, the end segment 12 or 32 is then turned back upon itself to form loop 16 of a desired size. Upon the formation of loop 16, which is adapted to the size and location of a surgical site 40 on a patient's body 41, strings 15 or clip fastener 35 are fastened about a middle portion of the respective hose 11 or 31 to maintain the end segment 14 or 34 in the shape of loop 16.

With respect to surgical lighting device 20, the loop (see loop 16 in FIG. 4) is formed prior to the connection of hose 21 to light source 18. The size of the loop may be adjusted to the specific surgical conditions either before or after connection of hose 21 to light source 18.

Prior to and during an operation performed by a surgeon at surgical site 40, the configuration of hose 11, 21 or 31 may be modified to conform the hose to changing surgical conditions. Where hose 11, 21, or 31 is provided with pivotable couplings 23a or 33a, the orientations of light output ports 23 or 33 may be quickly and easily adjusted by the operating surgeon during the surgical procedure.

Figure 5:
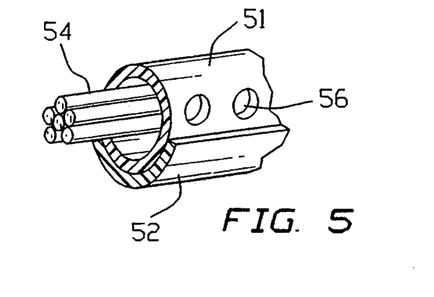
FIG. 5 is a partial cross-sectional side view of another embodiment of a lighting device including a flexible hose in accordance with the present invention.

As illustrated in FIG. 5, a lighting hose 51, which may take the form of hose 11, 21, or 31, is provided along a longitudinally extending surface with an adhesive strip 52 for releasably attaching the hose to a patient's skin about a surgical site. Adhesive strip 52 serves to fix the hose at the surgical site so that it does not shift during the surgical procedure. In addition, the adhesive strip serves to conform hose 51 to the shapes of the patient's body in a region about the surgical site.

As further illustrated in FIG. 5, an optical fiber bundle 54 extends through hose 51 for transmitting visible electromagnetic radiation from a remote light source (e.g., source 18 in FIG. 4) to a plurality of light output or outlet ports 56.

Figure 6:
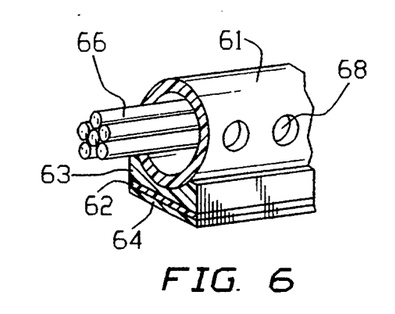
FIG. 6 is a partial cross-sectional side view of an additional embodiment of a lighting device including a flexible hose in accordance with the present invention.

As depicted in FIG. 6, a lighting hose 61, which may take the form of hose 11, 21, or 31, is provided along a longitudinally extending surface with an adhesive strip 62 attached to the hose via a buffer strip or cushion 63. Cushion 63 is made of a resilient foam-like material and serves to maximize the surface of the adhesive strip 62 which is in contact with the patient's skin surface at the surgical site. Adhesive strip 62 is preferably a two-sided adhesive strip and is covered, prior to a first use and between subsequent uses of the lighting device, with a release liner 64.

FIG. 6 also depicts an optical fiber bundle 66 which extends through hose 61 for transmitting visible electromagnetic radiation from a remote light source (e.g., source 18 in FIG. 4) to a plurality of light output or outlet ports 68.

Figure 7:
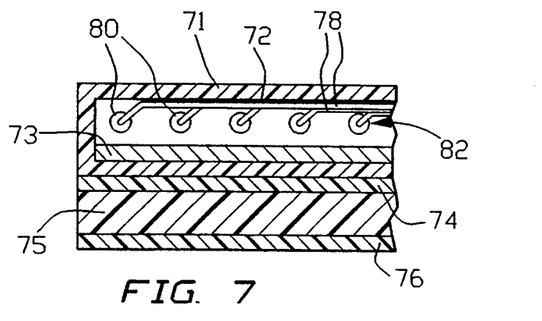
FIG. 7 is a partial cross-sectional side view of a further embodiment of a lighting device including a flexible hose in accordance with the present invention.

As illustrated in FIG. 7, another lighting hose 71 in accordance with the present invention is provided on an inner surface 72 with memory strip 73 in the form of an elongate metallic member. A two-sided adhesive strip 74 joins to an outer surface of hose 71 an elongate spacer member 75 which serves to set hose 71 at a distance from a surgical site, in a direction measured generally perpendicularly to the surface of the site. Spacer member 75 is provided along a side opposite tube or hose 71 with an adhesive layer 76 for attaching the hose to the patient's skin about the site of the surgery.

As additionally illustrated in FIG. 7, a plurality of optical fibers 78 extend through hose 71 for transmitting visible electromagnetic radiation from a remote light source (e.g., source 18 in FIG. 4) to pivotably coupling members 80 of a plurality of light output or outlet ports 82.

Figure 8:
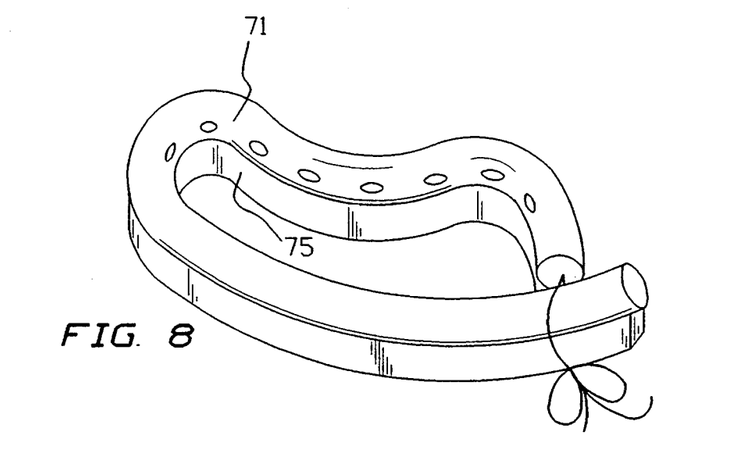
FIG. 8 is a partial perspective view of the lighting device of FIG. 7 in a use configuration.

As shown in FIG. 8, hose 71 may be formed by a surgeon or surgical assistant into a variety of shapes each corresponding to the shape of a particular surgical site. Memory strip 73 (FIG. 7) maintains hose 71 in an arcuate shape into which it has been bent.

It is to be noted that memory strip 73 may be embedded in the wall of hose 71 or may, alternatively, be fastened to the outside of the hose.

Figure 9:
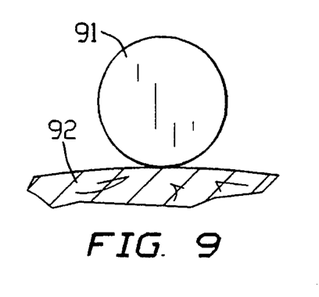
FIG. 9 is a diagrammatic end view of a lighting device including a flexible hose in accordance with the present invention, showing the hose in relation to a skin surface.
Figure 10:
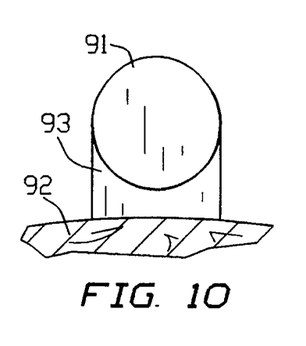
FIG. 10 is a diagrammatic end view of the lighting device of FIG. 9, showing the hose in another relation to the skin surface.
Figure 11:
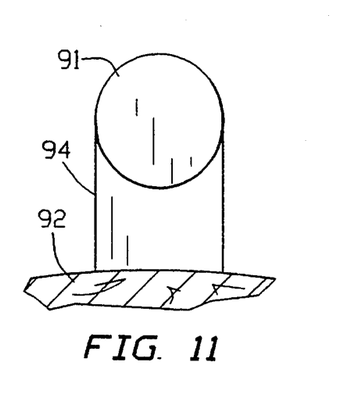
FIG. 11 is a diagrammatic end view of the lighting device of FIG. 9, showing the hose in yet another relation to the skin surface.

FIGS. 9, 10 and 11 diagrammatically illustrate three different relationships between a surgical lighting hose 91 and a skin surface 92. In FIG. 9, the hose is in direct contact with the skin surface. In FIG. 10, hose 91 is elevated above skin surface 92 by virtue of a spacer member 93. In FIG. 11, hose 91 is spaced a greater distance from skin surface 92 by interposition of a wider spacer member 94. Each tube or hose 91 may be provided with a plurality of spacer members 93 and 94, the surgeon or surgical assistant selecting the appropriate spacer member for the particular surgery to be performed. Generally, the larger the area at which the surgical procedure is to be implemented, the wider the spacer member and the farther the hose 91 from the surgical site in the orthogonal direction.

It is to be noted that a lighting hose in accordance with the invention is able to retain a selected loop-shaped form by the operation of tie strings 15, loop 25, or clip fastener 35, and/or by the operation of adhesive strip or layer 52, 62 or 76, and/or by the operation of metal memory strip 73.

Figure 12:
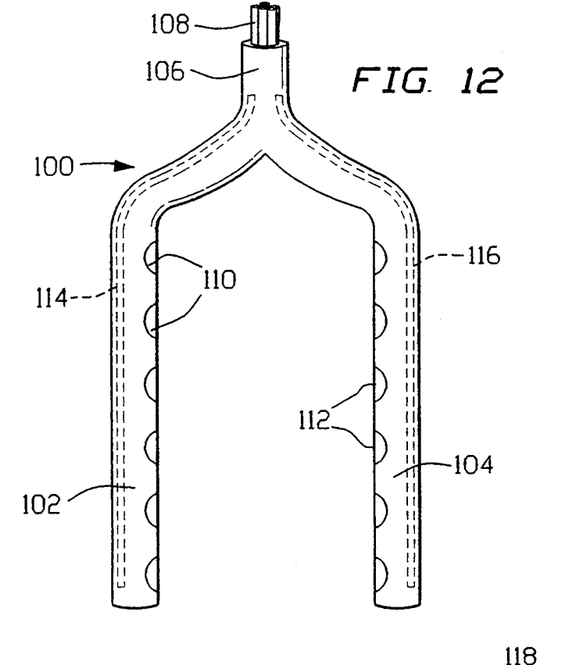
FIG. 12 is a top view of another lighting device including a flexible hose in accordance with the present invention.

As illustrated in FIG. 12, a surgical lighting hose 100 has a pair of flexible hollow prong sections 102 and 104 joined to one another at one end of a connector section 106 of hose 100. Connector section 106 is provided at an end opposite prong sections 102 and 104 with a light transmitting line or optical fiber bundle 108.

Prong sections 102 and 104 are provided along facing surfaces with a plurality of longitudinally spaced light output or outlet ports 110 and 112. Each prong section 102 and 104 is further provided with a respective bendable metal strip or rod 114 and 116 attached along an internal surface of the prong section, possibly by embedding the strip or rod in the flexible polymeric material of hose 100.

Figure 13:
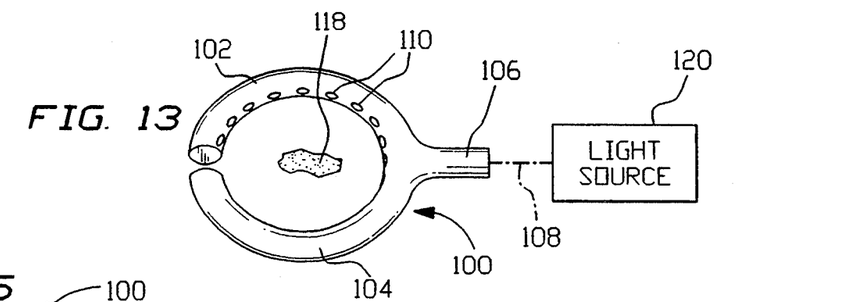
FIG. 13 is a diagrammatic perspective view of the lighting device of FIG. 12, showing the lighting device connected to a light source and in use during a surgical operation.

As shown in FIG. 13, prong sections 102 and 104 of hose 100 can be deformed, by virtue of bendable metal strips 114 and 116, to assume a circular or loop-shaped form disposable about a surgical site 118 on a patient's skin surface. Upon connection of hose 100 to a light source 120 via coupling 108, and an energization of light source 120, the surgical site is illuminated via light output or outlet ports 110 and 112. As discussed hereinabove with reference to FIGS. 1 and 2, ports 110 and 112 may be connected to prong sections 102 and 104 via respective pivotable coupling elements (not illustrated).

Figure 14:
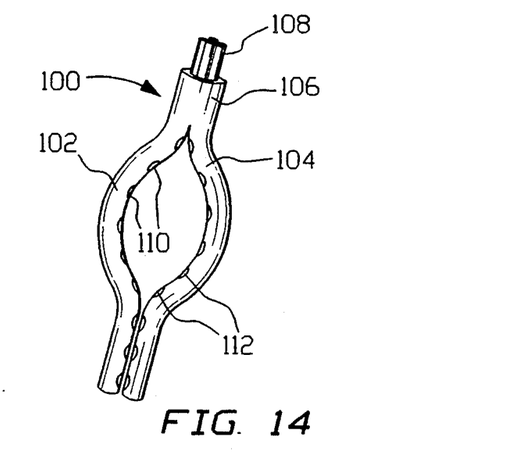
FIG. 14 is a top view of the lighting device of FIG. 12 in another use configuration.

As depicted in FIG. 14, prong sections 102 and 104 may be bent in other ways to provide other loop-shaped forms of differing sizes and shapes, to adapt hose 100 to the particular surgical conditions.

Figure 15:
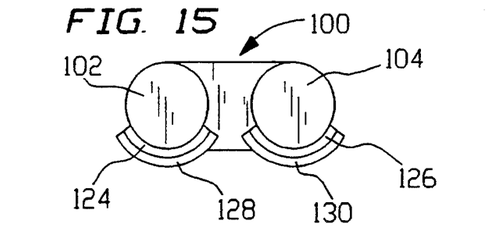
FIG. 15 is a diagrammatic end view of the lighting device of FIG. 12.
Figure 16:
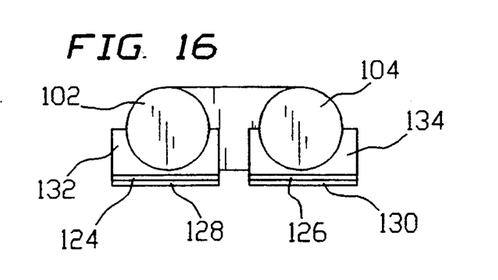
FIG. 16 is a diagrammatic end view of another lighting device similar to the hose of FIG. 12.

As shown in FIG. 15, prong sections 102 and 104 are provided along lower surfaces with respective two-sided adhesive strips 124 and 126 each covered prior to use of hose 100 by respective release liners 128 and 130. FIG. 16 illustrates that resilient spacer strips 132 and 134 may be provided between adhesive strips 124 and 126, on the one hand, and prong sections 102 and 104, on the other hand, to increase the contact area between the adhesive strips and a skin surface to which prong sections 102 and 104 are to be attached during a surgical procedure.

Figure 17:
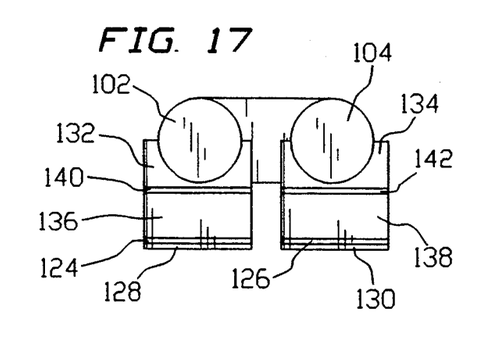
FIG. 17 is a diagrammatic end view of yet another lighting device including a flexible hose similar to the hoses of FIGS. 12 and 16.

As depicted in FIG. 17, further spacer elements 136 and 138 together with respective adhesive layers 140 and 142 may be inserted between two-sided adhesive strips 124 and 126, on the one hand, and spacer strips 132 and 134, on the other hand, to further increase the distance between prong sections 102 and 104 and the patient's skin surface to optimize suction during a surgical procedure.

Figure 18:
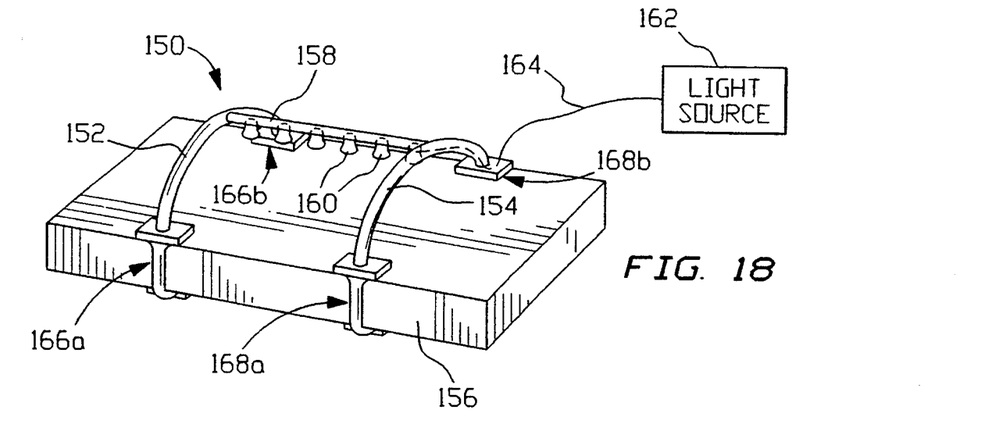
FIG. 18 is a schematic perspective view of a lighting device including a rigid frame in accordance with the present invention, showing the frame on an operating table.

As illustrated in FIG. 18, a surgical lighting device comprises a rigid frame 150 including a pair of bridging members 152 and 154 for spanning a patient (not illustrated) on an operating table 156. Bridging members 152 and 154 are spaced from and connected to one another by an elongate bar 158 to which a plurality of light output ports 160 are pivotably mounted. Light output ports 160 are operatively connectable to an electromagnetic radiation source 162 via an optical fiber bundle 164. Bridging members 152 and 154 are releasably attachable to operating table 156 via respective pairs of clamping members 166a, 166b and 168a, 168b.

Bridging members 152 and 154 are spaced from one another by a distance which enables ready access to a surgical site disposed between the bridging members. Moreover, bridging members 152 and 154 may take the form of shallow arcs to facilitate a surgical assistant's reaching over the bridging members 152 and 154, if necessary during an operation.

Figure 19:
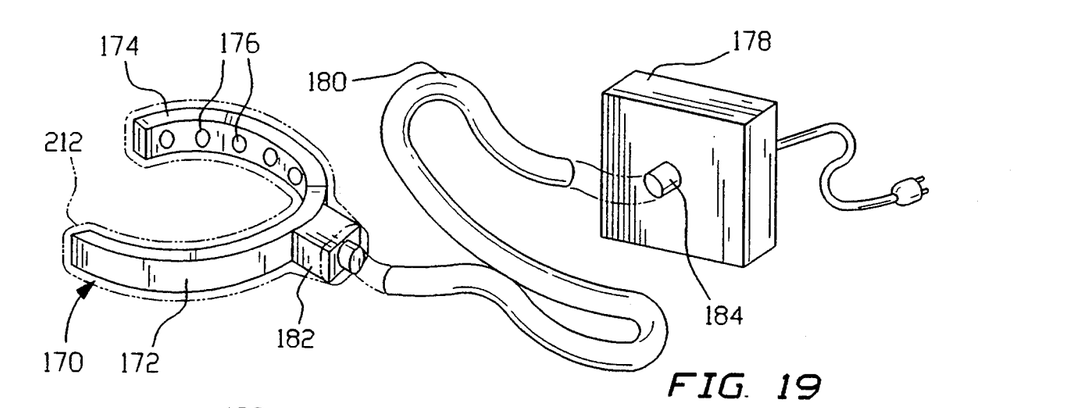
FIG. 19 is a schematic perspective view of a surgical lighting device including a surgical retractor in accordance with the present invention.

As depicted in FIG. 19, another surgical lighting device comprises a surgical retractor 170 having a pair of arms 172 and 174, or jaws in the event that the arms are pivotably connected to one another. Arms 172 and 174 are each provided with a plurality of spaced light output or outlet ports 176 which are connectable to a light source 178 via a fiber optic bundle 180 and a pair of coupling members 182 and 184. Retractor 170 is used like any similar surgical retractor to maintain body tissues of a patient (not shown) in a displaced or retracted configuration which facilitates access by a surgeon to underlying tissues during an operation. Prior to or after disposition of retractor 170 during an operation, light source 178 is energized to enable the transmission of electromangetic radiation to and through output ports 176.

Figures 20, 21:
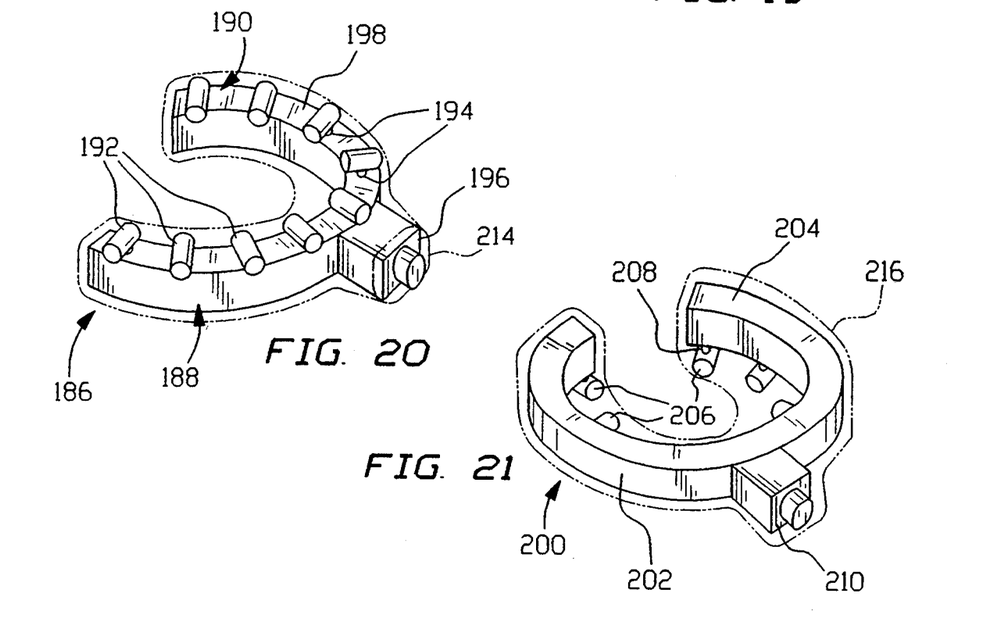
FIG. 20 is a schematic perspective view of another lighting device including a surgical retractor in accordance with the present invention.
FIG. 21 is a schematic perspective view of yet another lighting device including a surgical retractor in accordance with the present invention.

FIG. 20 depicts a surgical lighting device similar to that of FIG. 19. The surgical lighting device of FIG. 20 comprises a surgical retractor 186 having a pair of arms or jaws 188 and 190. Arms 188 and 190 are each provided with a plurality of spaced light output or outlet ports 192 which are mounted to arms 188 and 190 via respective pivotable couplings 194. Retractor 186 is provided with a coupling member 196 for connecting ports 192 to a light source (not shown in FIG. 20) via a fiber optic bundle (not shown). Light output ports 192 are disposed along an upper edge 198 of retractor arms 188 and 190 for facilitating the illumination of a relatively superficial surgical site, for example, in hernia repair or breast surgery.

As shown in FIG. 21, another surgical lighting device includes a surgical retractor 200 having a pair of arms or jaws 202 and 204. Arms 202 and 204 are each provided with a plurality of spaced light output or outlet ports 206 which are mounted to arms 202 and 204 via respective pivotable couplings 208. Retractor 200 is provided with a coupling member 210 for connecting ports 206 to a light source (not shown in FIG. 20) via a fiber optic bundle (not shown). Light output ports 206 are disposed along a lower edge or edges (not visible) of retractor arms 202 and 204 for facilitating the illumination of a relatively deep surgical site, for example, an open abdomen.

As illustrated by dot-dash lines in FIGS. 19, 20 and 21, retractors 170, 186 and 200 may be fitted with disposable transparent sheaths 212, 214, and 216 each made of a flexible film material. As discussed hereinafter with reference to FIGS. 23 and 24, sheaths 212, 214, and 216 are preferably provided with fasteners (not shown) for releasably attaching the sheaths to the respective retractors.

Figure 22:
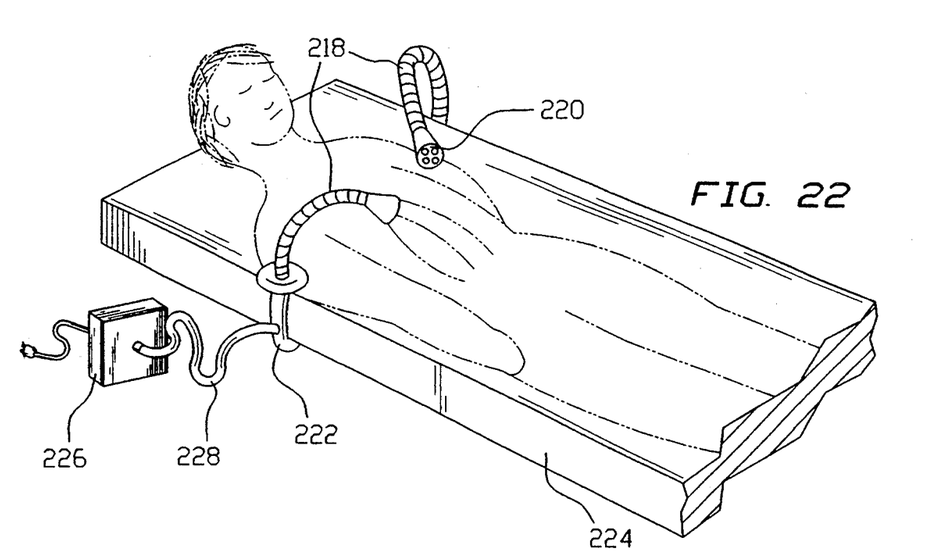
FIG. 22 is a schematic perspective view of a lighting device including a gooseneck support in accordance with the present invention, showing the gooseneck support on an operating table.

FIG. 22 illustrates two identical surgical lighting devices each comprising a gooseneck type support arm 218 provided at an upper end with one or more light output ports 220 and at a lower end with a coupling or clamping device 222 for removably fixing the gooseneck support to an operating table 224. Light output ports 220 are operatively connectable to a source of electromagnetic radiation 226 via a fiber optic cable 228.

Figures 23, 24, 25:
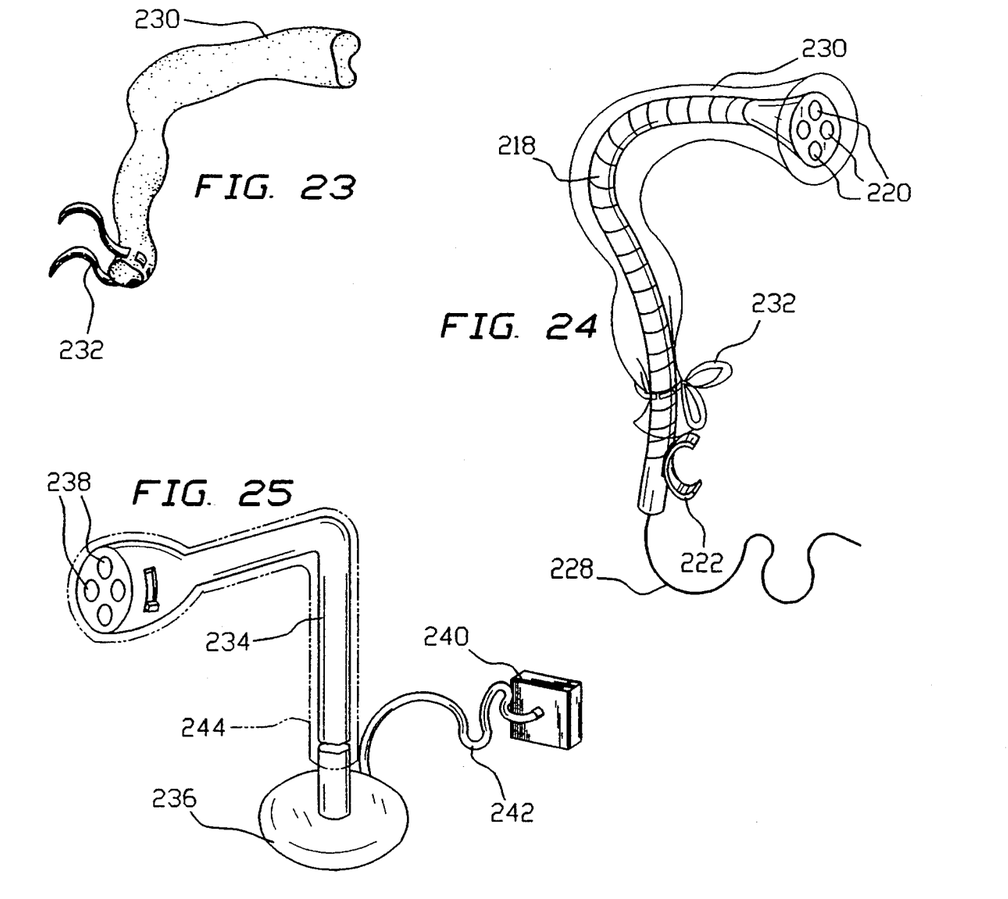
FIG. 23 is a schematic perspective view of a disposable transparent sheath for use on a lighting device in accordance with the present invention.
FIG. 24 is a schematic perspective view of the disposable transparent sheath of FIG. 23, showing the sheath on a gooseneck lighting device in accordance with the present invention.
FIG. 25 is a schematic perspective view of a cold light lighting device in accordance with the present invention, showing the device with a disposable transparent sheath in phantom lines.

FIG. 23 depicts a disposable transparent sheath 230 made of a flexible film material such as polyethylene. Sheath 230 is provided with a fastener 232, for example, in the form of a draw string, for releasably attaching sheath 230 to gooseneck support 218, as illustrated in FIG. 24. Fastener 232 may alternatively take the form of a snap-lock fastener, a VELCRO type fastener, an elastic band, etc.

FIG. 25 shows a surgical lighting device having an inverted L-shaped support arm 234 which is provided at a lower end with a base 236 which sits on an operating table or operating room floor. Light output or outlet ports 238 at an upper end of support arm 234 are operatively connectable to a source of electromagnetic radiation 240 via a fiber optic cable 242. A protective disposable sheath 244 of transparent flexible polymeric sheet material may be disposed about the lighting device.

It is to be noted that surgical lighting tubes 11, 21, 31, 51, 61, 71, 91, and 106 may also be provided with disposable sanitary sheaths made of transparent flexible membrane material such as polyethylene, and provided with fasteners for releasably attaching the sheaths to the lighting tubes.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are preferred by way of example to facilitate comprehension of the invention and should not be construed to limit the scope thereof.

What is claimed is:

1. A method for use in surgery to illuminate a surgical site on a patient, comprising the steps of:

providing a substantially flexible elongate carrier member with at least one linear tubular end segment having a free end and a plurality of colinearly disposed individual light outlets spaced from one another longitudinally along said end segment;

forming at least a portion of said carrier member end segment into an arcuate configuration conformed to said surgical site;

fastening said free end of said end segment to a middle portion of said end segment, said end segment being maintained in said arcuate configuration at least in part by virtue of said step of fastening;

disposing at least said portion of said end segment on the patient so that said portion is at least partially juxtaposed to the surgical site and so that said light outlets can effectively illuminate said surgical site;

surgically operating on organic tissues at said surgical site;

during the step of operating, transmitting electromagnetic radiation from a light source through said carrier member and out through said light outlets to illuminate the surgical site; and exerting a force on said portion of said end segment to maintain said portion of said end segment in said arcuate configuration during said steps of operating and transmitting.

2. The method defined in claim 1 wherein said step of disposing includes the step of removably affixing said end segment to a skin surface of the patient at said surgical site.

3. The method defined in claim 2 wherein said step of removably affixing includes the step of applying an adhesive strip to said skin surface, said adhesive strip being attached to said portion of said end segment.

4. The method defined in claim 3 wherein said portion of said end segment is maintained in an arcuate configuration at least in part via said adhesive strip.

5. The method defined in claim 1 wherein said portion of said end segment is provided with bendable means attached to said end segment for maintaining said end segment in said arcuate configuration, further comprising the step of deforming said bendable means so that said end segment assumes said arcuate configuration.

6. The method defined in claim 1 wherein means are provided on said end segment for independently varying the orientations of said light outlets, further comprising the step of manually adjusting the orientations of a plurality of said light outlets to differentially vary the direction of light emitted thereby.

7. The method defined in claim 1, further comprising the steps of providing said end segment with a spacer element and attaching said spacer element to said skin surface to control the distance of said end segment from said surgical site.

8. The method defined in claim 1 wherein said end segment is bifurcated along said end segment into two end segment sections each provided with a plurality of spaced light outlets, said step of forming including the step of bending at least a portion of one of said end segment sections into an arcuate shape.

9. The method defined in claim 1 wherein said end segment is further provided with a disposable sheath surrounding said carrier and removably fastened at least indirectly thereto, further comprising the step, implemented after said steps of operating and transmitting, of removing said sheath from said end segment.

10. A method for use in surgery to illuminate a surgical site on a patient, comprising the steps of:

providing a substantially flexible elongate carrier member with at least one linear tubular end segment having a free end and a plurality of colinearly disposed individual light outlets spaced from one another longitudinally along said end segment, means being provided on said end segment for independently varying the orientations of said light outlets;

forming at least a portion of said carrier member end segment into an arcuate configuration conformed to said surgical site;

fastening said free end of said end segment to a middle portion of said end segment, said end segment being maintained in said arcuate configuration at least in part by virtue of said step of fastening;

disposing at least said portion of said end segment on the patient so that said portion is at least partially juxtaposed to the surgical site and so that said light outlets can effectively illuminate said surgical site;

manually adjusting the orientations of a plurality of said light outlets to differentially vary the direction of light emitted thereby;

surgically operating on organic tissues at said surgical site;

during the step of operating, transmitting electromagnetic radiation from a light source through said end segment and out through said light outlets to illuminate the surgical site; and exerting a force on said portion of said end segment to maintain said portion of said end segment in said arcuate configuration during said steps of operating and transmitting.

11. A method for use in surgery to illuminate a surgical site on a patient, comprising the steps of:

providing a substantially flexible elongate carrier member with at least one linear tubular end segment having a free end and a plurality of colinearly disposed individual light outlets spaced longitudinally from one another along said end segment;

forming at least a portion of said carrier member end segment into an arcuate configuration conformed to said surgical site;

fastening said free end of said end segment to a middle portion of said end segment, said end segment being maintained in said arcuate configuration at least in part by virtue of said step of fastening;

disposing at least said portion of said end segment on the patient so that said portion is at least partially juxtaposed to the surgical site and so that said light outlets can effectively illuminate said surgical site, said step of disposing including the step of adhesively affixing said end segment to a skin surface of the patient at said surgical site;

surgically operating on organic tissues at said surgical site;

during the step of operating, transmitting electromagnetic radiation from a light source through said end segment and out through said light outlets to illuminate the surgical site; and exerting a force on said portion of said end segment to maintain said portion of said end segment in said arcuate configuration during said steps of operating and transmitting.

12. The method defined in claim 11 wherein said portion of said end segment is maintained in an arcuate configuration at least in part via an adhesive strip on said end segment.

* * * * *